United States Patent [19]

Mikutowski

[11] Patent Number: 4,479,281
[45] Date of Patent: Oct. 30, 1984

[54] METHOD AND APPARATUS FOR CLEANING PHONOGRAPH RECORDS

[76] Inventor: Michael J. Mikutowski, 338 24th Ave. NE, Minneapolis, Minn. 55418

[21] Appl. No.: 460,670

[22] Filed: Jan. 24, 1983

[51] Int. Cl.³ .......................... A47L 5/36; A47L 9/02
[52] U.S. Cl. .................... 15/303; 15/306 R; 15/354; 15/415 R; 369/72
[58] Field of Search ............... 15/421, 354, 415 R, 15/310, 311, 306 R, 306 A, 308, 303; 369/72

[56] References Cited

U.S. PATENT DOCUMENTS

| | | | |
|---|---|---|---|
| 1,994,616 | 3/1935 | Leitzell | 15/354 X |
| 2,237,638 | 4/1941 | Sinclair | 369/72 |
| 2,296,156 | 9/1942 | Fuller | 369/72 |
| 3,031,195 | 4/1962 | Lunsford | 369/72 X |
| 3,218,082 | 11/1965 | Taylor et al. | 369/72 |
| 3,220,739 | 11/1965 | Lipski | 369/72 |
| 3,313,548 | 4/1967 | Moore et al. | 369/74 |
| 3,410,464 | 11/1968 | Shatavsky | 369/74 |
| 3,440,681 | 4/1969 | Hixson et al. | 15/421 X |
| 3,897,069 | 7/1975 | Lee | 369/72 |
| 4,198,061 | 4/1980 | Dunn | 369/73 X |

Primary Examiner—Chris K. Moore
Attorney, Agent, or Firm—James V. Harmon

[57] ABSTRACT

A device is described for vacuum cleaning phonograph records. The device includes a suction head with an elongated slot that is positioned immediately above the grooves on the record during use. A flexible adapter is provided for securing the suction head to the cleaning tool of a household vacuum cleaner. The suction head includes a valve for turning on and off the applied vacuum.

11 Claims, 7 Drawing Figures

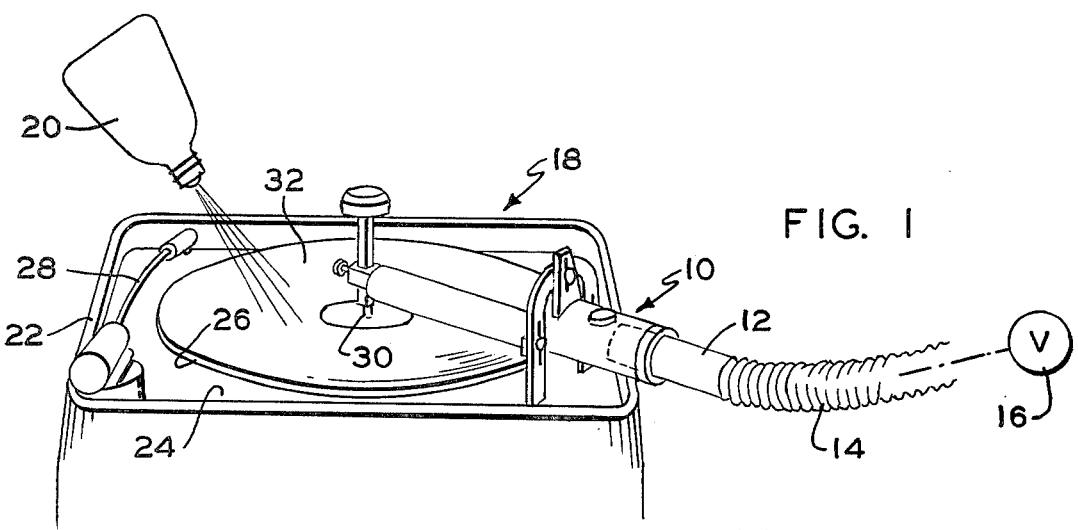
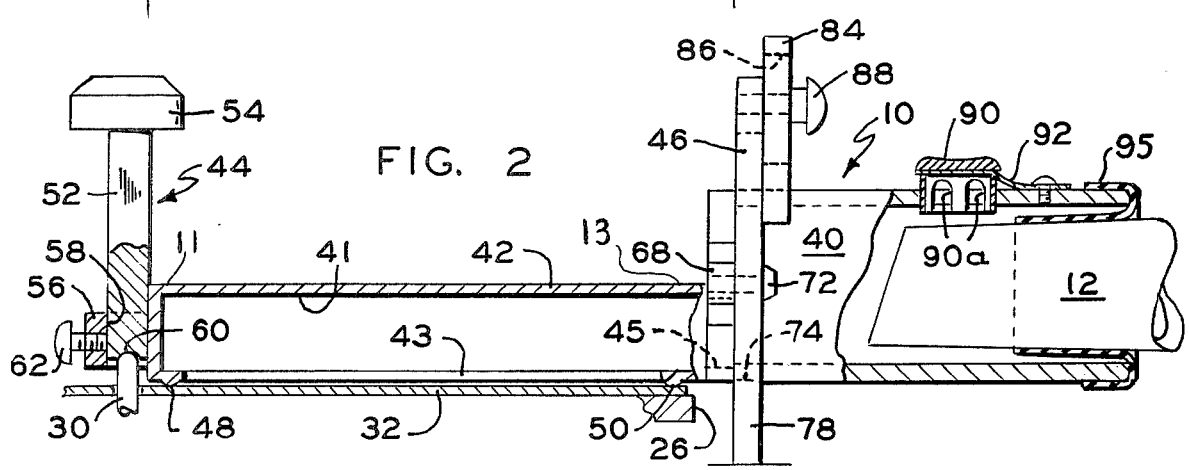
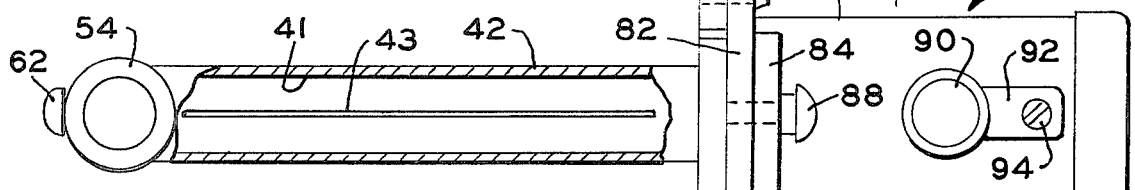
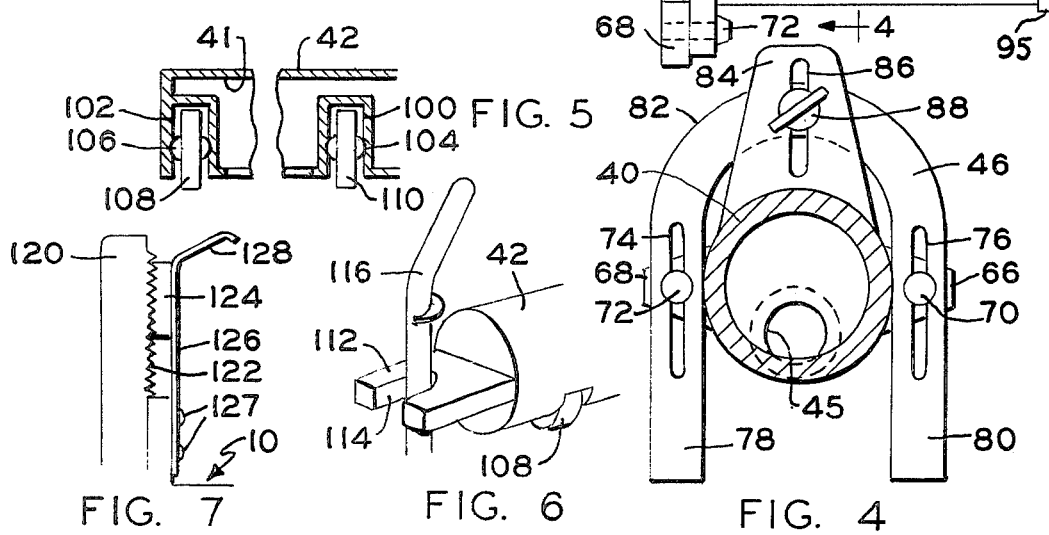

METHOD AND APPARATUS FOR CLEANING PHONOGRAPH RECORDS

FIELD OF THE INVENTION

The invention relates to phonograph equipment and more particularly to a method and apparatus for cleaning phonograph records.

BACKGROUND OF THE INVENTION

Numerous devices have been previously proposed for cleaning phonograph records by vacuuming them. For example, Pat. No. 3,218,082 describes a vacuum powered attachment for a record player that includes an arm communicating with a suction fan contained in the record turntable. This approach, however, makes the record turntable bulky, heavy and expensive. A similar approach is taken in U.S. Pat. No. 3,031,195. Generally, the small size of the blower assembly suited for use in a turntable will cause the vacuum that is to be applied to the record to be relatively weak and ineffective.

Another problem encountered in the prior art is the inability to accurately and precisely position the vacuum head in close proximity to the surface of the record while at the same time permitting the vacuum head to be removed and replaced as often as necessary after each record is placed on the turntable while at the same time maintaining the precise position and height adjustment of the vacuum head above the record. Another problem is to find a way to control the amount of applied vacuum as the vacuum head is placed in position or removed so that the records are not accidentally lifted up by the suction head when the head is removed after the cleaning operation is completed. Thus, these approaches previously taken are expensive and unable to provide a powerful vacuum that will quickly and effectively clean a series of records. In addition to this, the device should be portable, adapted for use anywhere and suited for a variety of record players of either the manual or automatic type. It should be easy to operate and provision must be made for enabling the unit to be lifted and replaced repeatedly as each record is placed in succession on the turntable for cleaning.

SUMMARY OF THE INVENTION

In accordance with the present invention, a method and apparatus is provided for cleaning phonograph records in which a household vacuum cleaner is employed to provide the required vacuum used in cleaning the record. The apparatus is adapted to be used with a record player of either the automatic or manual type. The record player includes the usual cabinet having a top wall upon which is located a rotating record turntable and a tone arm. The present invention includes a suction head and adapter enabling the suction head to be connected to the vacuum cleaner. The adapter acts as a handle so the device can be held in the hand, placed in position and removed repeatedly from the location immediately above the record while the record turns on the table. The suction head is elongated, extends from the center of the record to its outer edge and includes a downwardly directed suction slot communicating through the suction head to the adapter. A support means is provided at the outer end of the device for supporting the suction head and adapter on the record player. A support is also preferably provided at the end of the suction head for engagement with the spindle upon which the record is engaged. During operation the vacuum slot is placed in close proximity to the record so that the vacuum applied through the suction head removes dirt and fluid if any from the surface of the record beneath it.

In a preferred embodiment of the invention, a pair of legs is provided at the outer end of the suction head for engagement with the top wall of the record player to support the suction head. Both of these legs are preferably vertically movable and adapted to be selectively positioned to regulate the height of the suction head. A spindle engaging support at the center or inner end of the suction head is also mounted for vertical movement on the suction head and a releaseable locking means is provided holding it in a selected postion to regulate the elevation of the inner end of the suction head.

THE FIGURES

FIG. 1 is a perspective view showing the invention in operation.

FIG. 2 is a side elevational view partly in sections showing the invention during use on a larger scale.

FIG. 3 is a plan view of FIG. 2 partly broken away.

FIG. 4 is a transverse cross-sectional view taken on line 4—4 of FIG. 3.

FIG. 5 is a vertical sectional view similar to FIG. 2 of a modified form of suction head.

FIG. 6 is another modified form of the invention showing a different kind of spindle engaging support.

FIG. 7 is a side elevational view of another form of the invention.

DESCRIPTION OF THE PREFERRED EMBODIMENTS

Refer now to the figures and particularly to FIG. 1.

Shown in FIG. 1 is a record cleaning unit in accordance with the present invention designated generally by the numeral 10. The record cleaning apparatus 10 during operation is connected to a suction tool 12 in vacuum line or flexible hose 14 of an ordinary household vacuum cleaner indicated diagramatically at 16. An automatic or manual record player indicated generally at 18 includes the usual cabinet having a top wall 24, the rim 22 and turntable 26. A tone arm 28 at the left is shown in a nonoperating position. Resting on the turntable 26 is a record 32 which is centered on a spindle 30. The record cleaning apparatus 10 is shown in the operating position more clearly seen in FIG. 2 with its inner end 11 adjacent the center of the record 32 and its outer end 13 adjacent the outer end of the recorder. The details of construction of the apparatus will be described more fully below. Shown in FIG. 1 above the record player is a bottle 20 of cleaning fluid which is preferably applied before the apparatus is used for cleaning the record. The cleaning solution contained in the bottle can be applied if the bottle is formed from a flexible plastic by squeezing the bottle so that a stream of the cleaning solution covers the surface of the record. The cleaning solution per se forms no part of the present invention. A variety of cleaning solutions can be used such as alcohol and mixtures of alcohol with water.

As shown in FIG. 2, the apparatus includes a horizontally disposed tubular adapter portion 40 at its outer end and a tubular suction head 42 having an inner bore 41 that communicates with the hollow interior of the adapter 40 through an opening 45 (FIGS. 2 and 4). On the bottom of the suction head 42 is an elongated slot 43 that extends during use radially of the record 32 in a position in close proximity to it. The dimensions of the slot are not critical but a width of about 1/16" is suitable for most purposes. During operation the suction applied from the tool 12 of the vacuum cleaner 16 through the adapter 40 draws air from the hollow interior 41 of the suction head through the slot 43 thereby removing dirt and foreign material from the upper surface of the record 32.

At the inner end of the suction head 42 is a support 44 comprising a vertically disposed post 52 of square cross-section having a positioning knob 54 at its upper end. The post 52 is slideable vertically in a square opening 58 within a bracket 56 having a releasable locking means such as a set screw 62. In this way the vertical elevation of the post 52 can be selectively changed as desired to locate the elevation of the inner end 11 of the suction head as required for proper operation. It will also be noted that the suction head is provided with a pair of downwardly extending record engaging nibs 48 and 50 at its inner and outer ends respectively adjacent the ends of the slot 43. These nibs may project down about 1/32" from the surface of the suction head to engage the parts of the record that have no recorded material on them to keep the suction head just above the surface of the record. At the bottom of the post 52 is a hemispherical recess 60 within which the upper end of the spindle 30 is held during operation thereby stabilizing the inner end of the suction head.

Projecting laterally from the central or inner end of the adapter 40 is a pair of horizontally extending diametrically opposed brackets 66 and 68 each affixed at its central end to the side wall of the adapter 40. The brackets 66 and 68 have pins projecting horizontally from them in parallel relationship each with an enlarged head 70 and 72 respectively. These pins are slideably mounted within slots 74 and 76 on the legs 78 and 80 of a suction head support means 46. The legs 78, 80 are parallel to one another and extend vertically on opposite sides of the adapter 40. The legs are connected together at their upper ends by means of a U-shaped center section 82. Also projecting from the adapter 40 is a vertically disposed bracket 84 having a vertically disposed slot 86 within which is mounted a set screw 88 that is screw threaded at 89 into the connecting section 82 of legs 78 and 80. Accordingly, when the set screw 88 is loosened, the adjustable legs can be raised or lowered and the selected position established whereupon the set screw 88 is tightened thereby releaseably locking the legs 78, 80 at the desired elevation so that the suction head is firmly supported on the upper surface of the top wall 24 of the record player at its outer end by the legs, the inner end being supported by the post 52 of the support 44. In this way, the suction head is supported in part by the nibs 48, 50 but primarily by the legs 78, 80 and the support 44. While most support is by the legs and by the post 52, the nibs 48, 50, however, prevent the record 32 from striking the suction head by accident. From this it will be understood that the user can quickly clean a number of records in rapid succession by holding the unit by hand in the operating position of FIG. 1 and after removing and replacing it as each record in succession is removed and replaced, the suction head will always be held at the proper elevation by the legs and the support 44. The knob 54 at the top of the post 52 can be used as a handle for the left hand while the right hand supports the adapter 40.

The air control will now be described in connection with FIGS. 2 and 3. As shown in the figures, an air control button 90 is mounted for up and down sliding motion within an opening bored in the top of the adapter 40. The button 90 includes downwardly extending cylindrical walls having vertical openings 90a and a leaf spring 92 normally retains the button 90 in the elevated position of FIG. 2. The leaf spring can be suitably attached at its outer end to the adapter 40 for example by means of a screw 94. When the button 90 is in its raised position as shown in FIG. 2, air will be able to enter the adapter through the openings 90a and the vacuum at the slot 43 will be considerably reduced. However, when the button is depressed, the openings 90a will be shut off and the entire vacuum applied through the tool 12 will be exerted through the slot 43 to the record. In this way, depressing the button 90 will enable the full force of the vacuum to be used in cleaning the record but by allowing the spring 92 to raise the button 90, the reduced vacuum at the slot 43 will enable the user to lift the tool from the record when the cleaning operation is completed without accidentally lifting the record at the same time.

Refer now to FIG. 5 which illustrates a modified form of the invention. As shown in the figure, a pair of downwardly opening pockets or recesses 100 and 102 are provided at the inner and outer ends 11 and 13 respectively of the suction head 42. In each of the pockets is provided a record engaging wheel 108, 110. The support wheels 108, 110 replace the nibs 48, 50 in this case and each of the wheels is mounted for rotation on a suitable axle 106, 104 comprising projections which extend into recesses within the walls of the pockets 102 and 100 respectively.

Refer now to FIG. 6 which shows an alternate form of a spindle engaging support. As shown in the figure, there is provided a horizontally extending bracket 112 projecting centrally from the inner end 11 of the suction head 42. In the center of the bracket 112 is a centrally opening recess 114 adapted to engage the spindle 116 of an automatic record changer which is much longer than the spindle 30 of the unit shown in FIGS. 1 and 2. In this case, the height adjustment for the inner end of the suction head is maintained by the record engaging wheel 108 and only the lateral position is maintained by the bracket 112 and recess 114 in engagement with the spindle 116.

Refer now to FIG. 7 which illustrates a modified form of a releasable locking mechanism for the legs. In FIG. 7, 10 represents the record cleaning apparatus and 120 represents the upper portion of the legs 78, 80 corresponding to the connecting section 82. Upon the upper end of the apparatus is a spring steel retainer 126 secured in place by means of screws 127. On the spring 126 is mounted a block 124 having serrations adapted to engage serrations 122 of the leg support 120. At the top of the spring is a manually engagable handle 128 which when drawn toward the right in the figure, will disengage the serrations on the block 124 from those on the legs 120. When this is done, the vertical position of the legs can be changed as required up or down. The spring 126 is then released engaging the serrations of the block 124 with serrations 122 of the leg 120, thereby holding the leg 120 in the selected position vertically with respect to the suction head 10.

The vacuum cleaner tool can be sealed in any suitable manner within the outer end of the adapter. One convenient way of doing this is through the provision of a rubber sealing boot or sleeve 95 having an outer portion engaged on the outer surface of the adapter and an inwardly directed central section of the proper size to securely engage the outer surface of the tool 12. In this way, the end of the tool 12 can be inserted easily into the open end of the adapter and reliably sealed against air leakage.

To use the invention, the household vacuum cleaner is placed near the record player and the vacuuming tool 12 is inserted into the adapter 40 as shown in FIGS. 1 and 2. The record player is then set to run at 45 rpm, although 33-⅓ rpm can be used if desired. The height of the legs 78, 80 and the support 44 is established to locate the slot 43 is close proximity to the upper surface of the record 32. When this is done, the nibs 48, 50 will be touching the parts of the record that are free from grooves. The releaseable locking means 62 and 88 are then set in the locked position. It will be noted that the legs 78, 80 can be elevated all the way to the bottom surface of the adapter 40. This enables the invention to be used with record players of the type having recessed turntables, i.e., those in which the turntable is at about the same elevation as the top wall 24 of the record player. The cleaning solution is then applied by squeezing the bottle 20 until the solution covers the entire surface of the record. A small handheld brush (not shown) can be used for distributing the cleaning solution uniformly over the record. The vacuum cleaner is then turned on and the record is allowed to rotate. The button 90 is depressed allowing the vacuum applied through the tool 12 to be exerted through the slot 43. After a few turns, all of the cleaning solution and foreign material will be removed from the upper surface of the record. The button 90 is then released and the apparatus is lifted from the record which can then be turned over to clean the reverse side. The apparatus should be allowed to remain in place until the fluid is gone.

The apparatus is highly effective in operation and through its use, old or used records with dust and dirt caked on them can be quickly and easily cleaned. The invention is better than systems requiring a brush or the like because the use of the brush has a tendency to grind the dirt into the record as the brush is scrubbed against the delicate surface of the record. If a cleaning liquid were used by itself, particles would remain trapped in the record grooves even though a towel or other absorbent material is used to wipe the surface of the record. The new method in accordance with the present invention provides a deeper cleaning action since the dirt containing cleaning fluid is lifted right off the surface of the record and it is the sucking up of the fluid containing suspended dirt and grime that has proved especially effective in making possible a thorough cleaning. Thus, while the invention is useful for old records, it can also be used for maintaining the good condition of new records. The invention, moreover, is adapted to any record player now on the market and no special modifications need to be made. In addition, a very powerful vacuum can be provided by the action of the household vacuum cleaner and since this is normally available, no added expense is required. The invention is therefore quite low in cost.

Many modifications can be made in the invention. For example, the bracket 56 can be removably mounted on the end of the suction head 42 and the bracket 112 used to replace it when desired. In this way, the bracket 56 and 112 can be considered interchangeable. Interchangeability can be provided in many ways, for example by the use of a tongue and groove fitting between the brackets and the inner end of the suction head 42.

It should be noted that the slot 43 extends the entire radius of the record 32. Although the slot could be replaced by a series of openings, a continuous slot 43 is preferred since in that way no section of the record will be inadvertently missed.

The suction head has been shown as a hollow tube about an inch in diameter. Other possibilities exist, for example the suction head can be of any desired cross-sectional shape or if desired can comprise a metal bar having a bore extending from one end to the opposite end therein. It could also comprise a bar having a hollow tube affixed as by welding to its bottom edge, with a slot extending longitudinally of the tube.

While the vacuum cleaner has been secured in place by means of a rubber boot, it is possible to attach it in other ways, for example by the provision of a threaded connection or sliding connection formed from rigid parts having close tolerances.

It the leg means 78, 80, 82 is of sufficient size or the bottom end of the legs themselves provided with a sturdy base, the support 44 at the inner end of the suction head is not utterly essential.

Other variations can be made, for example a rotating elbow can be provided if desired between the outer end of the apparatus and the suction tool 12. This would enable the tool 12 to be connected to the apparatus at any desired angle.

A great many other variations in the invention will be apparent to those skilled in the art within the scope of the appended claims once the principles disclosed herein are understood.

What is claimed is:

1. A record cleaning apparatus for use with a record player turntable and a household vacuum cleaner, said apparatus comprising a suction head having inner and outer ends with an elongated suction slot extending longitudinally thereof and adapted to be positioned radially of the record, support means operatively associated with the suction slot for holding the slot above a record placed on the turntable and in close proximity to it to remove dirt and liquid, if any, from the record as the record turns below the suction head and an adapter communicating with the slot through the suction head to the household vacuum cleaner whereby the vacuum produced in the vacuum cleaner is applied through the slot of the suction head to remove dirt and liquid if any from the record beneath the suction head as the turntable rotates beneath it.

2. The apparatus of claim 1 wherein the suction head is provided with a three-point suspension comprising a pair of suspension points adapted to rest on the record player for supporting the outer end of the suction head and a third suspension securing the inner end of the suction head to the record player.

3. The apparatus of claim 2 wherein the pair of suspension points adapted to rest on the record player comprise a pair of vertically extending legs connected together at their upper end above the adapter and means is operatively connected thereto for locating the legs at a selected vertical position upon the apparatus.

4. The apparatus of claim 1 wherein a manually controllable vacuum regulating opening is provided in the suction head to permit the level of the vacuum present at the slot to be set at the desired level whereby the vacuum can be applied after the suction head is placed in position for cleaning to thereby prevent the vacuum present at the slot from lifting the record off the turntable when the suction head is raised before or after the cleaning operation is completed.

5. A record cleaning attachment for a household vacuum cleaner to be used with an automatic or manual record player, said attachment comprising a suction head and having an adapter at its outer end and a normally horizontally disposed vacuum slot at its inner end below the elevation of the adapter for positioning in close proximity to the record on the record player, a spindle connecting means at the inner end of the suction head to connect the suction head to the spindle of the record player, air sealing means at the adapter to permit the vacuum cleaner to be connected thereto in airtight relationship whereby the vacuum developed by the vacuum cleaner can be communicated through the suction head to the vacuum slot and a support leg means at the outer end of the suction head adapted to extend downwardly therefrom to a top wall of the record player to hold the suction head at a predetermined distance above it so that whenever a record is placed on the turntable the suction head will be positioned by the spindle connecting means and the support leg means a proper distance above the record turntable with the slot in close proximity to the record.

6. The apparatus of claim 5 wherein the spindle connecting means is movable vertically and includes a selectively adjustable retainer means for releaseably locking it in a selected position for adjusting the height of the inner end of the suction head.

7. The apparatus of claim 6 wherein the spindle connecting means includes a manually engagable knob to aid the user in positioning the suction head on the spindle.

8. The apparatus of claim 7 wherein phonograph record engaging wheels are provided for rotation on the suction head and extend downwardly therefrom to contact the record to thereby support the suction head above it.

9. The apparatus of claim 5 wherein the support leg means comprises at least one support leg adapted to be selectively moved up and down with respect to the suction head and releaseable locking means for selectively controlling the vertical position of the support leg means.

10. The apparatus of claim 1 wherein a spindle engaging fork is provided at an inner end of the suction head, said fork including a pair of centrally extending members adapted to engage the spindle on opposite sides thereof when the suction head is in position for use.

11. The apparatus of claim 1 wherein said support means includes support leg means provided on the apparatus, said support leg means is movable vertically thereon to change the height of the apparatus, a resiliently engagable serrated member is provided to contact the leg means for locating the leg means at a selected vertical position upon said apparatus.

* * * * *